United States Patent [19]

Matthews

[11] Patent Number: 4,591,016
[45] Date of Patent: May 27, 1986

[54] BRAKE SYSTEM IN A VEHICLE HYBRID DRIVE ARRANGEMENT

[75] Inventor: Charles C. Matthews, Utica, Mich.

[73] Assignee: General Motors Corporation, Detroit, Mich.

[21] Appl. No.: 590,779

[22] Filed: Mar. 19, 1984

[51] Int. Cl.$^4$ .................................................. B60K 9/04
[52] U.S. Cl. .................................... 180/165; 180/197; 192/4 A; 192/9
[58] Field of Search ............... 192/4 A, 4 C, 0.033, 192/0.082, 0.055, 0.094, 9; 180/165, 197; 60/545; 74/572, 751, 752, 752 A

[56] References Cited

U.S. PATENT DOCUMENTS

| | | | |
|---|---|---|---|
| 3,774,736 | 11/1973 | Ito et al. | 192/4 A |
| 3,886,810 | 6/1975 | Sugiyama et al. | 74/572 |
| 4,246,988 | 1/1981 | Hoppie | 192/4 A |
| 4,342,371 | 8/1982 | Smitley | 192/0.094 |
| 4,361,871 | 11/1982 | Miller et al. | 180/197 |
| 4,473,753 | 9/1984 | Izumi et al. | 180/165 |
| 4,479,356 | 10/1984 | Gill | 180/165 |

*Primary Examiner*—George H. Krizmanich
*Attorney, Agent, or Firm*—D. D. McGraw

[57] ABSTRACT

A system used in conjunction with a hybrid flywheel drive. The hydraulic service brake system is conventional. The continuously variable transmission, flywheel, and control system for hybrid operation is super-imposed on the hydraulic system. A pressure transducer added to the master cylinder provides a voltage control signal. A solenoid valve added to the hydraulic circuit for the front service brakes, activated by the hybrid control system, may be closed during regenerative braking to trap the front hydraulic brake pressure, thereby enhancing energy recovery by regeneration. The flywheel clutch is closed to begin regeneration.

15 Claims, 6 Drawing Figures

BRAKE SYSTEM IN A VEHICLE HYBRID DRIVE ARRANGEMENT

The invention relates to brake systems used in a hybrid drive system including a flywheel or similar energy storage and release arrangements for vehicle drive. It more particularly relates to such systems directed to the recovery of vehicle kinetic energy which is normally dissipated in the service brakes. Rather than converting this energy to heat in the brakes, it is possible to recover and store the energy in a suitable mechanism such as a flywheel. The system uses a continuously variable transmission and flywheel system as well as a control system to manage the energy recovery, storage and release.

A major function of the flywheel hybrid system is energy recovery through regenerative braking. To maximize this process on an ideal basis, all of the vehicle deceleration would be accomplished through regenerative braking. However, this may not be practical for a number of reasons. First, the regenerative braking normally acts only on the drive axle or axles of the vehicle and not on all of the vehicle wheels. Therefore, braking is not obtained in a desirably balanced manner on all of the vehicle wheels and the maximum braking effort is not utilized when less than all of the wheels are being braked. Furthermore, when all of the vehicle deceleration is accomplished by regenerative braking, the vehicle drive train must be designed over-strength to accommodate the heavy braking torque loads, leading to extra mass and possibly to decreased overall vehicle efficiency. The energy storage mechanism, hereinafter referred to as a flywheel, must be limited to some maximum design speed. When this speed has been attained, as on a long downgrade, it must be declutched and the service brakes automatically brought into use. Therefore, vehicle service brakes must be provided and used under certain conditions.

Deceleration limits must be imposed on the regenerative braking system, as determined by factors such as vehicle stability response limits and drive line torque capacity limits. Above these deceleration limits utilizing regenerative braking, the combination of regenerative and service brakes must be used. Therefore a transition must occur from regenerative braking to or in combination with the activation of the service brake system under some conditions. The systems embodying the invention herein disclosed and claimed relate to suitable service brake systems and regenerative brake systems and the interface with the hybrid drive system which will provide appropriate brake operation with no loss in braking capacity and with desirable brake operational features.

The systems embodying the invention were developed with various design criteria as guidelines. These include the provision of a front-wheel drive vehicle wherein regenerative braking occurs only on the front wheels. The service brake system has no reduction in service brake capacity as compared to vehicles having service brakes only for braking purposes. There are times when regenerative braking may not be available and the service brakes must be available at full capacity. The brake system must have the same safety features which are provided in standard service brake systems at a minimum. Dual hydraulic service brake system features are retained. Any inoperative condition in the electrical control portions of the system must not disable the service brakes. Regenerative braking is maximized in order to optimize energy recovery, but is consistent with the limits defined by vehicle stability and response characteristics as well as power train mechanical limitations. Transitions between braking loads must be automatic and unobtrusive. Brake proportioning or balance is not subject to undesirable variations during such transitions. The regenerative braking arrangements and the service braking arrangement must automatically operate with a single brake control such as a brake pedal, with which most vehicle operators are most familiar. The feedback or feel and sense of control of standard service brake systems currently in use is retained. Changes in the control force, travel, or feel are minimal during the transitions between brake systems.

It was established by appropriate testing that a desirable upper limit for regeneraive braking is about 0.3 g deceleration rate. Therefore any braking greater than this deceleration rate must be accomplished by use of the service brake system. Earlier developments in this area are exemplified by the disclosure in U.S. Pat. No. 4,181,366, issued Jan. 1, 1980 and entitled, "Integration of Regenerative Braking and Conventional Braking". That patent discloses a vehicle braking system with regenerative braking and conventional or service system braking, the system integrating the two braking forces to obtain a consistent total braking effort and brake pedal feel when the regenerative braking force decreases with the decrease in vehicle speed.

IN THE DRAWINGS

FIG. 1 schematically illustrates a basic vehicle brake system employing regenerative braking and service braking with an interface between the two braking systems forming the overall vehicle brake system. The regenerative braking system has been superimposed on the hydraulic service brake system.

Figure 1:
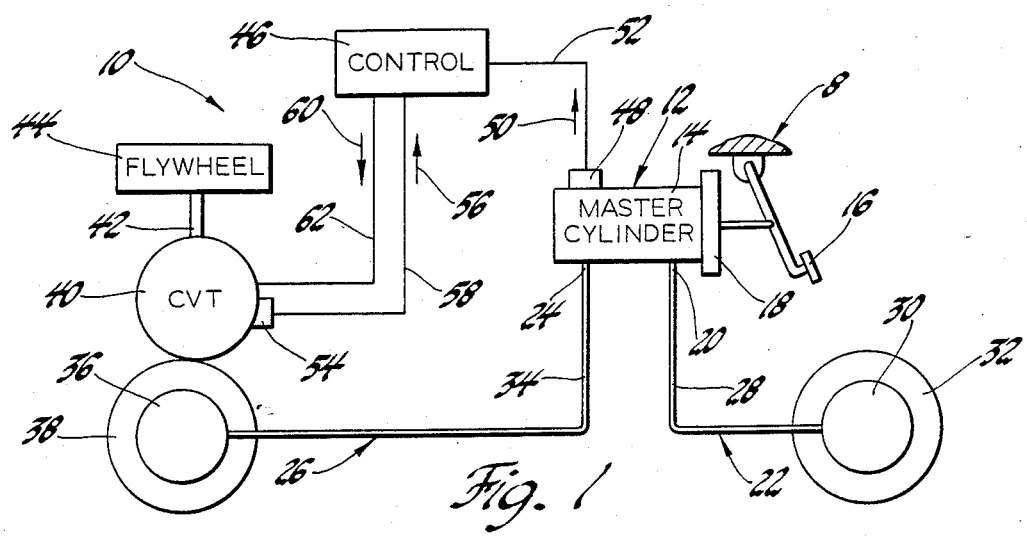
Figure 4:
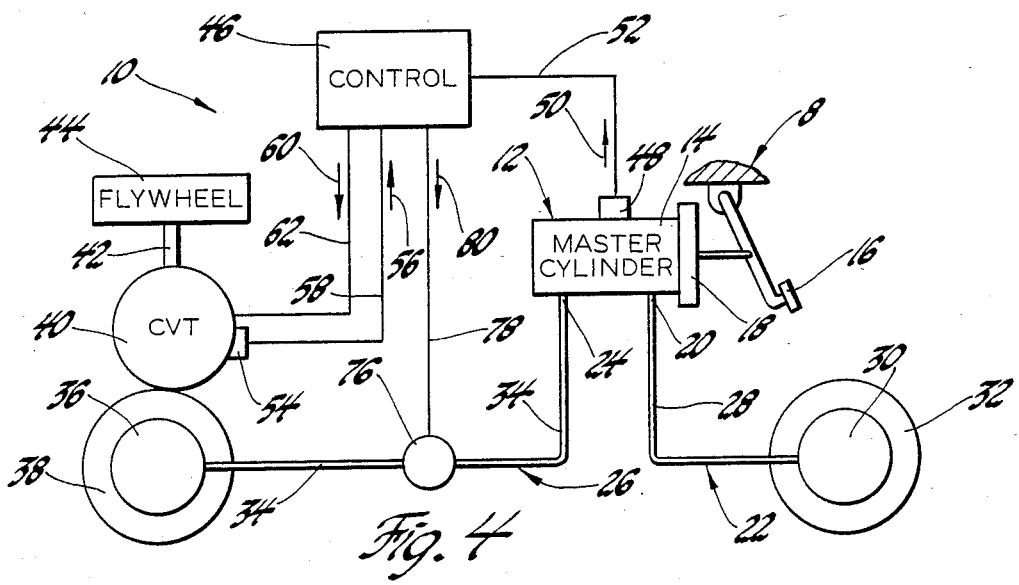

FIG. 4 schematically shows a brake system similar to that of FIG. 1 with a valve in the hydraulic brake conduit for the front service brakes being controlled by a control signal activated by the hybrid control system.

Figure 5:
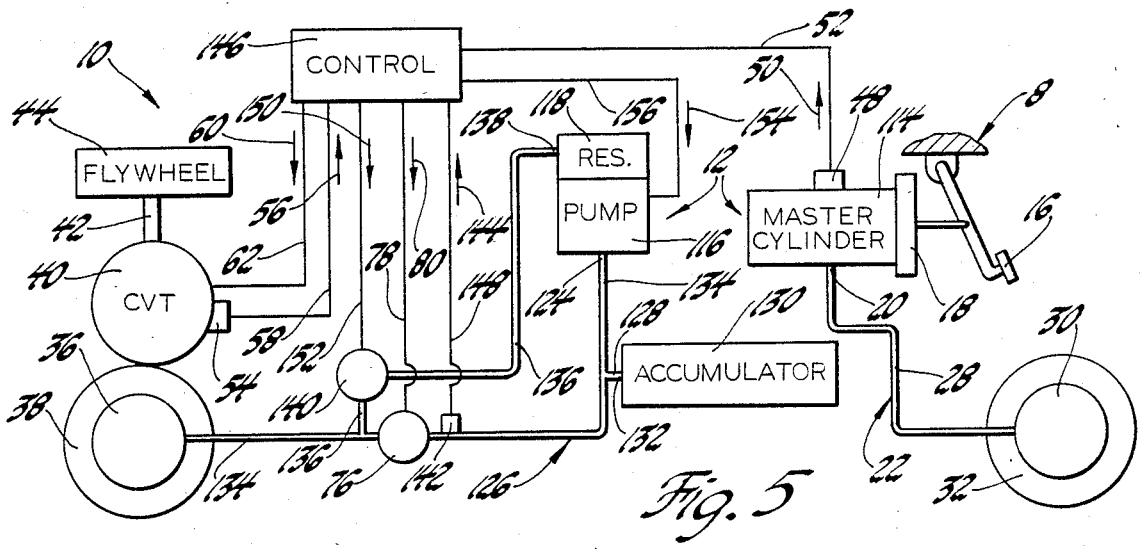

FIG. 5 shows a vehicle brake system having major changes in the hydraulic service brake system as compared to passenger vehicle service brake systems currently employed in production, as well as the addition of the regenerative braking system. The master cylinder of this system actuates the rear service brake and provides a proportional signal to the hybrid control system, the front service brakes and the regenerative braking both being modulated from rear master cylinder pressure. The front line pressure is supplied by a pump accumulator.

Figure 6:
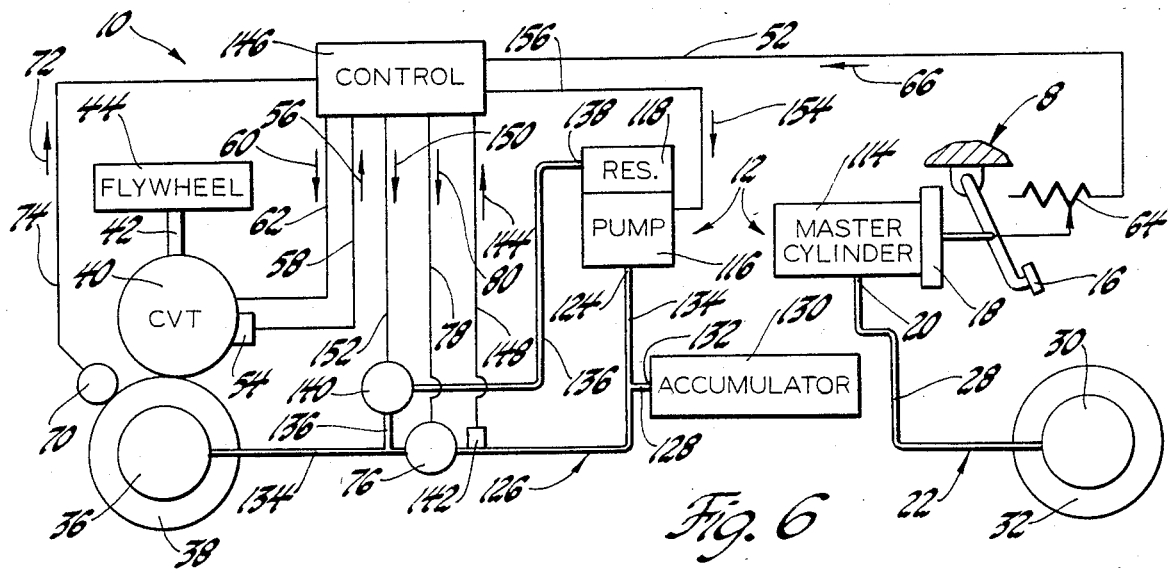

FIG. 6 shows a vehicle brake system similar to that of FIG. 5, with additional modifications. The rear master cylinder pressure signal has been replaced with a brake pedal travel signal and wheel lock sensors on the front wheels.

Since each of the schematically illustrated systems has numerous elements in common, the same reference numerals will be used in the description below for all such common elements. In the simplest system, illustrated in FIG. 1, the vehicle schematically illustrated at 8 has a vehicle brake system 10 formed with a hydraulic service brake system and a regenerative brake system. Brake system 10 includes a suitable pressure generating means 12, which is most appropriately a master cylinder 14. The master cylinder is schematically illustrated as being actuated by the vehicle operator through a brake pedal 16 acting through a brake booster 18 to operate the master cylinder. The master cylinder of FIG. 1 is schematically illustrated as being of the dual master cylinder type, well known in the art, with two pressurizing chambers connected to pressurize different brake hydraulic circuits. The cylinder therefore has an outlet 20 connected to the rear brake circuit 22 and an outlet 24 connected to the front brake circuit 26. The rear brake circuit includes a hydraulic brake line or conduit 28 connected at one end to outlet 20 and at the other end to the rear wheel brakes 30 which are appropriately constructed and arranged to act on the vehicle rear wheels 32. The front brake circuit 26 includes a hydraulic brake line or conduit 34 connected at one end to outlet 24 and at the other end to the front wheel brakes 36 which are constructed and arranged to provide braking action for front wheels 38. This system is one of the standard arrangements of a hydraulic brake service system commonly used in automotive vehicles.

The regenerative braking system of system 10 is schematically illustrated as being in a front wheel drive vehicle wherein the front wheels 38 are driven through a continuously variable transmission 40 from a suitable vehicle power source, not illustrated, but which may be an appropriate internal combustion engine or an electric motor by way of example. The continuously variable transmission 40 is schematically illustrated as having a suitable mechanical connection 42, which may include a clutch, for driving an energy stored and release means, which is preferably a flywheel 44, to store energy in the flywheel and to release energy from the flywheel and transmit that energy through connection 42 and the continuously variable transmission 40 to the driven front wheels 38. A hybrid vehicle brake system control mechanism 46 is provided to receive certain information signals and to generate and send certain control signals to various parts of the brake system.

In FIG. 1, the master cylinder 14 is provided with a pressure sensor and signal generator 48 which senses pressure generated by the master cylinder for one of the brake circuits 22 or 26 and generates a signal in accordance with the sensed pressure. The signal is illustrated as being an electrical information signal 50 transmitted by electrical lead 52 to the control mechanism 46. The information signal 50 is typically a voltage which is proportional to the master cylinder hydraulic pressure. Another sensor and signal generator 54 senses the ratio of the continuously variable transmission and generates an information signal 56 which is transmitted by electrical lead 58 to the control mechanism 46.

Control mechanism 46 utilizes the information signals received by it and generates one or more control signals to control various portions of the vehicle brake system. In FIG. 1, control mechanism 46 is illustrated as generating a control signal 60 which is transmitted by electrical lead 62 to the continuously variable transmission 40 to change the ratio of that transmission as needed during regenerative braking. The signal will also control the operation of flywheel 44 through the continuously variable transmission and the clutch of connection 42.

Figure 2:
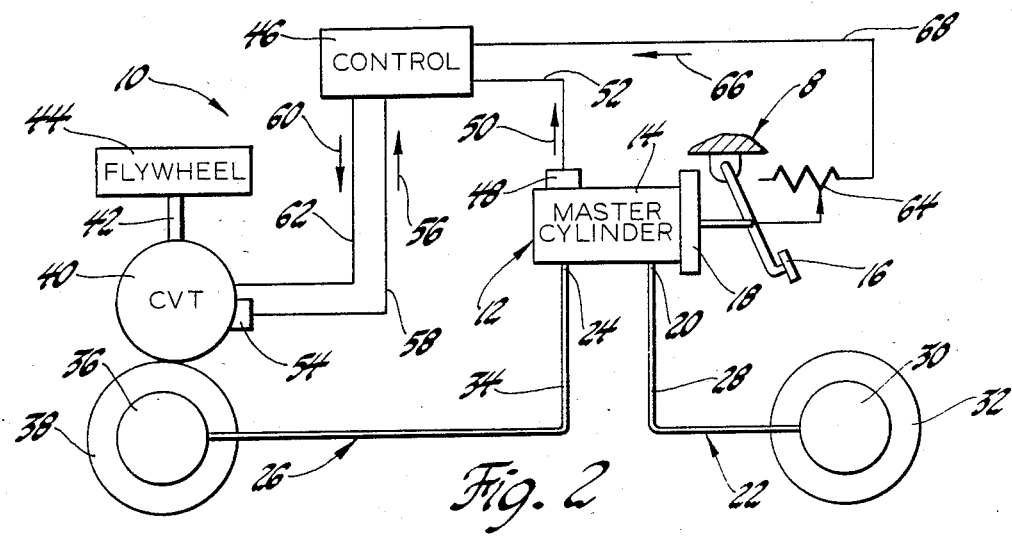
FIG. 2 is a schematic representation of a vehicle brake system similar to that of FIG. 1 with a transducer added to sense brake pedal travel.

The system schematically illustrated in FIG. 2 is similar to that of FIG. 1, and has a transducer or sensor and signal generator 64 added to sense brake pedal travel. The transducer 64 generates an information signal 66 which is indicative of brake pedal travel and that signal is transmitted through electrical lead 68 to the control mechanism 46. In this system, regenerative braking can be initiated by brake pedal travel without first generating master cylinder hydraulic pressure by utilizing some of the free travel of the brake pedal 16 before the master cylinder 14 is actuated. Regenerative braking can be modulated by either brake pedal travel or hydraulic pressure.

Figure 3:
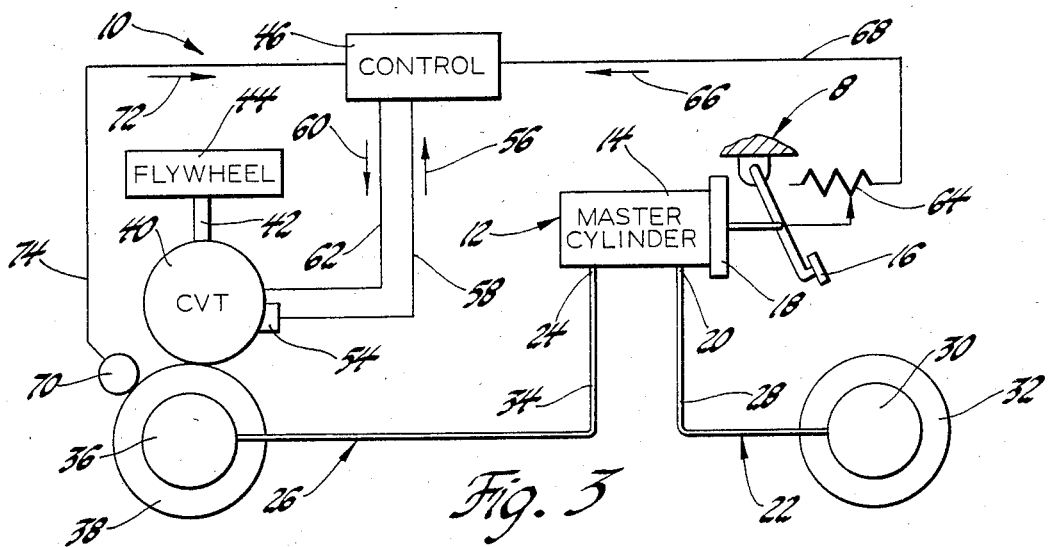
FIG. 3 is a system similar to that of FIG. 2, with the master cylinder pressure transducer replaced by wheel lock sensors on the front wheels.

FIG. 3 is somewhat similar to FIG. 2. The master cylinder pressure sensor and signal generator has been replaced by wheel lock sensors and signal generators 70 on the front wheels 38. A sensor and signal generator is provided for each of the front wheels, although only one set is schematically illustrated. Each of the sensors and signal generators 70 generates information signals schematically indicated at 72. Each of these signals is transmitted over electrical leads 74 connecting sensors and signal generators 70 to the control mechanism 46. It will be understood that separate electical leads 74 are provided for each of the sensors and signal generators 70 so that the information signals 72 are independently transmitted to control mechanism 46.

The system of FIG. 4 is similar to that of FIG. 1, with the addition of a solenoid valve 76 inserted in the front service brake conduit 34. Solenoid valve 76 is connected by an electrical lead 78 to the control mechanism 46 so that it may receive control signals 80 generated by control mechanism 46. Valve 76 is a normally open valve and, when activated by the control signal 80 generated by the control mechanism 46, is closed during regenerative braking to disable the front wheel hydraulic brakes 36, thereby enhancing the energy recovery by regeneration.

The system illustrated in FIG. 5 features a major change in the hydraulic service brake system as compared to the system of the earlier noted FIGS. The master cylinder 114 is a single chamber pressure generating master cylinder and is connected through conduit 28 to actuate only the rear wheel brakes 30. It has no hydraulic connection to the front wheel brakes 36. The line pressure for the front wheel brakes 36 is supplied by a small electro-hydraulic pump 116, the brake fluid for the front brake circuit being supplied by brake fluid in pump reservoir 118. The pump outlet 124 is connected to deliver pressurized fluid from the pump to the conduit 134 leading to the front wheel brakes 36. The front brake circuit 126 also includes a branch conduit 128 conected to accumulator 130 through the accumulator inlet/outlet 132. A solenoid valve 76 is positioned in conduit 134 in the same manner as valve 76 of the system of FIG. 4. A pressure return conduit 136 is connected to conduit 134 between solenoid valve 76 and front wheel brakes 36 and is also connected to the inlet 138 of reservoir 118. Another solenoid valve 140 is provided in conduit 136. The system of FIG. 5 also has a pressure sensor and signal generator 142 connected to the part of conduit 134 between solenoid valve 76 and the accumulator branch conduit 128. Sensor and signal generator 142 generates information signals in proportion to the hydraulic brake pressure in conduit 134 at this point. These information signals 144 are transmitted to the control mechanism 146 by electrical lead 148. The control mechanism 146 also generates control signals 150, transmitted by electrical lead 152 to solenoid valve 140, and control signals 154 transmitted by electrical lead 156 to pump 116. These signals are in addition to the signals generated in the system of FIG. 4.

The system of FIG. 6 is a combination of features of the system of FIG. 5 and the system of FIG. 3. It has replaced the pressure sensor and signal generator 48 of FIG. 5 with the brake pedal travel sensor and signal generator 64 and the wheel lock sensors and signal generators 70.

The identification of various terms and parameters are helpful in a discussion of the brake performance of the various systems. Brake pedal force is of interest because it is the vehicle driver's means of control of the vehicle brakes. A certain force on the brake pedal will produce a proportional hydraulic pressure in the master cylinder. This pressure may be distributed directly to the front and rear brake circuits, or it may be attenuated. In typical front-wheel drive brake systems in current production, the front brake line pressure is the same as the master cylinder pressure under all normal conditions of operation. The rear brake line pressure however, has a proportioning valve to attenuate the pressure. A typical proportioning valve may have a cut-off pressure of about 350 psi and slope of about 0.30. Thus at master cylinder pressures less than 350 psi the rear brake line pressure is the same as the master cylinder pressure. As pressures greater than 350 psi are generated by the master cylinder, however, the rear brake line pressure increases only 30% as fast as the master cylinder pressure increases. The characteristics of the proportioning valve may be changed to tailor the brake system to individual vehicle requirements, as is well known in the art.

The dynamic load on the front and rear axles of a vehicle changes as a function of deceleration rate. Load is transferred from the rear axle to the front axle as a function of deceleration rate, vehicle mass and center of gravity height, and length of the wheel base. Brake line proportioning valves are often used to compensate for the dynamic load changes. The proportioning or balance characteristics for the brake circuits involve the adhesion for each axle set of the vehicle wheels. The adhesion is defined as the ratio of braking force developed divided by the dynamic vertical load for each axle. The dynamic vertical load accounts for the load transfer induced by vehicle deceleration. Ideally, the adhesion for both axles should be equal to the deceleration rate under all conditions. As in most instances however, the ideal is a goal to be approached and is seldom achieved in practical terms. Thus the front and rear axle adhesion will fall on opposite sides of the ideal value. For example, if adhesion for the front axle is greater than the deceleration rate, than the adhesion for the rear axle will be less than the deceleration rate. Furthermore, the axle with a higher adhesion value will skid first on a low traction surface. Adhesion values are used to specify limiting brake system characteristics. For example, some government regulations will specify adhesion limits for the front and rear axles based on deceleration rate ranges.

Another measure of brake proportioning or balance is Utilization. Utilization is also calculated for each axle of the vehicle. It is defined as the ratio of the dynamic vertical load on an axle to the total vehicle mass divided by the ratio of the braking force at that axle to the total braking force. Thus it represents the ratio of the traction available at that axle to the total braking braking force available at the axle. The smaller value of Utilization is of interest since the axle with the smaller value will lock up first on a low cooefficient surface. Smaller values of Utilization imply a greater imbalance in the brake proportioning.

The vehicle brake system 10 of FIG. 1 has the regenerative braking system superimposed on the hydraulic service brake system. The transducer or pressure sensor and signal generator 48 and electrical lead 52 have been added to sense master cylinder hydraulic pressure. The information signal 50 is the input to the control mechanism 46 to modulate the regenerative braking. A typical front-wheel drive vehicle production brake balance may be used with the brake balance being set without regeneration. The system has the advantage of being the simplest and lightest weight of the various systems herein disclosed, and of having full hydraulic brakes, front and rear, regardless of the contribution from regenerative braking. Therefore, it uses regenerative braking rather than dissipating some of the braking energy as heat, but does not have ideal brake utilization when operating with regenerative braking. The system will have some brake balance changes between regenerative and non-regenerative braking modes and the brake pedal force will change to some extent between regenerative and non-regenerative braking modes at some similar deceleration rates. Since the hydraulic service brakes are always functioning, the maximum regenerative braking fraction is less than 50%, leading to less than ideal energy recovery.

With the addition of the brake pedal travel sensor and signal generator 64 to provide the system of FIG. 2, a signal 66 is also provided to the control mechanism 46 to provide the control mechanism with information about the amount of brake pedal travel during brake actuation. This permits regenerative braking to be initiated by the first increment of brake pedal travel which occurs before any hydraulic brake pressure creates service braking through the wheel brakes 30 and 36. The regenerative braking is modulated by the signal 66 responsive to brake pedal travel or the signal 50 responsive to the master cylinder generated hydraulic brake pressure. The system of FIG. 2 also features full hydraulic brakes, front and rear, regardless of the contribution from regenerative braking, and partial regenerative braking is available even if no service braking occurs when the brake pedal 16 is actuated. The system also features maximum regenerative energy recovery. It has no automatic transition from regenerative to non-regenerative braking modes. The brake balance changes as does the brake balance in the system of FIG. 1, and the brake utilization is similar to that of the system of FIG. 1.

In the system of FIG. 3, the master cylinder pressure transducer 48 has been replaced by the wheel lock sensors and signal generators 70 on the wheels 38. Regenerative braking is again initiated by brake pedal travel and is modulated by brake pedal travel signal 66 and the signals 72 from the wheel lock sensors and the signal generators 70. This system also features full hydraulic brakes regardless of the contribution from regeneration, and partial braking due to regenerative braking when the hydraulic service system is inoperative. Maximum regenerative energy recovery is still available. There is no automatic transition from regenerative to non-regenerative modes, and the brake balance changes between braking modes. Brake utilization and changes in brake pedal travel and pedal force are similar to those of the system of FIG. 2.

The system of FIG. 4 retains the hydraulic service brake system almost in production form. It includes the conventional dual master cylinder 14 and brake pedal 16, with the brake booster 18 being optional. Along with the production type front disc brakes used in front wheel brakes 36, it may typically use drum brakes as the rear wheel brakes 30. The continuously variable transmission 40, flywheel 44 and the control mechanism 46, with appropriate connections, are essential for hybrid operation and have been superimposed on the hydraulic service brake system. Two modifications have been included to complete the interface between the two braking systems. The pressure transducer 48 has been added to the master cylinder to provide the information signal 50 to control mechanism 46. Transducer 48 generates signal 50 as a voltage which is proportional to master cylinder hydraulic pressure and this voltage is transmitted to control mechanism 46 through electrical lead 52. In addition, the normally open solenoid valve 36 has been inserted in the front brake circuit conduit 34 intermediate the master cylinder outlet 24 and the front wheel brakes 36. This valve is energized so as to be closed when the control mechanism 46 generates the control signal 80 for this purpose. Control signal 80 is generated during regenerative braking to disable the front wheel service brakes 36, thereby enhancing energy recovery by regeneration.

The system of FIG. 4 retains the familiar single brake pedal 16 for control of the brake system by the vehicle driver. When brake pedal 16 is depressed, hydraulic brake pressure is generated in master cylinder 14 and signal 50 is sent to the control mechanism 46. At a very low master cylinder generated hydraulic pressure the solenoid valve 76 is closed, disabling the front wheel brakes 36. The mechanical connection 42, which preferably includes a flywheel drive clutch, is closed to begin regeneration. The hydraulic brake pressure in conduit 34 at which this occurs should be just enough to bring the front wheel brake pads in contact with the rotors, but without generating much braking torque. Thus during the initial application of the brakes by the operation of the brake pedal, the brake pedal retains its usual travel and feel to the driver. When the solenoid valve 76 is closed, the low hydraulic pressure is trapped in the portion of the front brake cirucit 26 between valve 76 and the wheel brakes 36 so that the front wheel brake pads remain lightly in contact with the brake rotors.

As more braking effort is required, the vehicle driver applies additional force to the brake pedal 16 in the usual manner. This increases the pressure generated by the master cylinder 14 and in particular the pressure to the rear service brakes 30. However, it does not increase the pressure delivered to the front wheel brakes 36. The increased hydraulic pressure also changes the signal 50 transmitted to the control mechanism 46, and calls for an adjustment to the regenerative braking system. The control mechanism 46 preferably includes a schedule of required front braking torque as a function of hydraulic pressure generated by the master cylinder. This schedule preferably duplicates the torque normally generated by the front service brakes 36. The schedule may be included as the required rate of flywheel acceleration as a function of master cylinder hydraulic pressure. This is easily accomplished since a flywheel speed signal is provided as a part of signal 56 for the control mechanism 46 by signal generator 54, and the torque required to accelerate the flywheel is a known factor. The flywheel acceleration, and therefore the regenerative braking torque, may be controlled in either of two ways. It may be controlled by changing the continuously variable transmission ratio or by modulating the flywheel clutch in connection 42. Control signal 60 is illustrated as being delivered to the continuously variable transmission 40 but it is understood that it can accomplish either or both of these controls. Slipping the flywheel clutch is less desirable because some of the available energy is then lost in heating the transmission oil. On the other hand, the transmission ratio control may not always provide sufficient response for adequate control. It is therefore preferable that change of the continuously variable transmission ratio and modulation of the flywheel clutch be used in combination to provide the necessary response at the highest efficiency.

It is preferable that, during the regenerative braking mode, the overall brake proportion of the vehicle not go through any appreciable change. This is accomplished within the limits of adequate response by the continuously variable transmission and the provision of a suitable schedule in the control mechanism 46. At the same time, the brake pedal force, travel, and feel have not changed for the vehicle driver. The overall braking rate is still controlled by the hydraulic pressure generated in the master cylinder 14 and the vehicle driver can modulate that pressure in the usual manner.

If the speed of flywheel 44 reaches its limit value, or if a vehicle deceleration rate greater than the previously established limit under regenerative braking is required, then a transition must be made from the regenerative mode to the service-braking mode on the front wheel brakes. In this case the transition is instituted either by the flywheel speed signal or by the master cylinder hydraulic pressure, depending upon the reason for requiring such transition. The transition is made simply by opening the flywheel clutch in the mechanical connection 42 in the continuously variable transmission 40, and simultaneously opening the hydraulic system solenoid valve 76. With the appropriate regenerative-braking control schedule in the control mechanism 46, discussed above, there is little or no change in the brake proportioning and little or no effect on the rate of vehicle decleration or vehicle handling. There may be a small change in brake pedal travel because of the small pressure trapped in the front wheel brakes, keeping the brake pads in contact with the rotors. This pressure must be brought up to full service brake pressure when the solenoid valve 76 is opened, with additional deflection in the front wheel brake calipers and hydraulic lines requiring a slight additional amount of pedal travel to accomplish this increase in pressure.

The brake system of FIG. 4 accomplishes several important objectives. The regenerative braking mode operates only on the front axle and there has been no change in the hydraulic service brake capacity. Any change in brake proportioning will tend to change more towards the front, further enhancing regenerative energy recovery. Brake system safety has not been degraded. The additions to the service brake system have not introduced adverse operating conditions if portions of the added mechanism do not operate as intended. Solenoid valve 76 is a normally open unit so that the loss of electrical power in the vehicle or an inoperative condition of the solenoid itself will not effect the usual service brake operation. An inoperative condition of the transducer 48 will only disable regenerative braking and will have no effect on the hydraulic service brakes. If the hydraulic pressure sensor and signal generator 48 is positioned so as to be responsive to pressure in the rear brake circuit 22 rather than the front brake circuit 26, front regenerative braking would still be available even if the front brake circuit did not operate to produce braking force at the front wheel brakes 36.

On balance, the vehicle brake system of FIG. 4 is considered to be a practical system for use in production vehicles even though it does not achieve the ideal conditions in all circumstances. For example, the front wheel brakes are very lightly energized during regenerative braking, causing a small amount of drag and loss of energy. In addition, the rear hydraulic service brakes 30 are always functional whether the entire system is in the regenerative mode or not. This creates an additional energy loss. However, vehicle stability and brake system safety are considerably improved, and the energy losses may be minimized by adjusting the brake proportioning.

The control mechanism 46 is programmed to remain in the service brake mode, once a high limit transition has been made, until the master cylinder pressure decreases below the minimum value required for actuation of solenoid 76. This prevents the trapping of relatively high hydraulic pressure in the front brake system with the solenoid valve closed if the hydraulic pressure has exceeded the upper limiting value for regeneration and the system has automatically changed to the service brake mode and the driver subsequently has reduced the brake pedal force. Thus after the sensed hydraulic pressure has fallen below the minimum value for solenoid valve actuation, the control mechanism will be reset to again permit use of the regenerative mode of operation. The problem of possibly trapping high hydraulic pressure in front brake system under these conditions can also be minimized by setting the high limit transition to the maximum value that can be tolerated by the mechanical limits of the continuously variable transmission. Assuming that the proper brake proportioning can be maintained during generation by the control mechanism and the continuously variable transmission, a relatively low deceleration limit does not necessarily apply. The upper deceleration limit may then be determined by the torque capacity of the continuously variable transmission 40. If, for example, this is raised to about 0.6 g deceleration rate, the reverse transition situation discussed above would rarely be encountered.

In one example of the system of FIG. 4 it has been established that as much as 84 percent of the braking energy is available for regeneration in the range of deceleration which is most commonly encountered by vehicle drivers. This is accomplished by increasing the regenerative energy fraction by changing the brake proportioning or balance. The proportioning valve for the rear brake pressure circuit, for example, may be modified by lowering its cutoff pressures significantly and increasing its slope to some extent, maintaining current production brake proportioning at high deceleration rates. Also, the actuation pressure for closing solenoid valve 76 is so set that the closing pressure is high enough to bring the front wheel brake pads into contact with the front wheel brake pads into contact with the front wheel rotors so that the brake pedal travel will not be extended to any extent when the valve is reopened, but keeping it as low as reasonably possible in order to reduce energy losses. In a system of this type, it has been found that the brake pedal force as a function of deceleration rate is little different from the current production system.

The system shown in FIG. 5 features a major change in the hydraulic service brake system as well as the addition of the regenerative system. A single master cylinder 114 is used which actuates only the rear service brakes and is not hydraulically connected to the front brake circuit 126. While brake booster 18 is illustrated, it is contemplated that it will not longer be required since the master cylinder is only actuating the rear brakes 30. The front service brakes 36 and the regenerative braking are both modulated from rear brake circuit master cylinder pressure. The front service brakes are modulated using solenoid valves 76 and 140. Front line pressure is supplied by the small electro-hydraulic pump 116. A hydraulic accumulator 130 has been added to supply limited brake line pressure to the front brake circuit 126 in the event that the electrically powered pump becomes inoperative.

This system features regenerative energy recovery over the full deceleration range and the same wheel lock control as typical production vehicles now have on all traction surfaces. There is no change in brake balance between the regenerative and the non-regenerative modes, and the brake Utilization is comparable to current production vehicles. The system can transfer automatically from the regenerative braking mode to the non-regenerative braking mode, with no change in either brake pedal travel or force.

The system of FIG. 6 is similar to that shown in FIG. 5 with some modifications to give improvements in system operation under certain adverse conditions. The rear master cylinder pressure signal generator has been replaced with a brake pedal travel sensor and signal generator 64 and with wheel lock sensors 70 on the front wheels 36. In this system, even if hydraulic brake pressure is not generated in the master cylinder 114, the front service brakes will continue to be operable as will the regenerative braking system, under control of brake pedal travel as sensed by the sensor and signal generator 64.

The embodiments of the invention in which an exclusive property or privilege is claimed are defined as follows:

1. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including at least one information signal indicating at least one operational condition in said vehicle brake system and another information signal from said continuously variable transmission indicating an operational condition of said continuously variable transmission;

and control means receiving said at least one information signal and said another information signal and generating one or more control signals, one such control signal controlling said continuously variable transmission in accordance with said information signals received by said control means to control regenerative braking of said front wheel brakes and storage of front wheel braking energy in said energy storage means.

2. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including at least one information signal indicating at least one operational condition in said vehicle brake system and another information signal from said continuously variable transmission indicating an operational condition of said continuously variable transmission, said at least one vehicle brake system operational condition indicated by said at least one signal including a brake actuating pressure being generated by said brake actuating pressures generating means;

and control means receiving said at least one information signal and said another information signal and generating one or more control signals, one such control signal controlling said continuously variable transmission in accordance with said information signals received by said control means to control regenerative braking of said front wheel brakes and storage of front wheel braking energy in said energy storage means.

3. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including at least one information signal indicating at least one operational condition in said vehicle brake system and another information signal from said continuously variable transmission indicating an operational condition of said continuously variable transmission, said at least one vehicle brake system operational condition indicated by said at least one signal including brake actuating pressure being generated by said master cylinder during master cylinder actuation;

and control means receiving said at least one information signal and said another information signal and generating one or more control signals, one such control signal controlling said continuously variable transmission in accordance with said information signals received by said control means to control regenerative braking of said front wheel brakes and storage of front wheel braking energy in said energy storage means.

4. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including at least one information signal indicating at least one operational condition in said vehicle brake system and another information signal from said continuously variable transmission indicating an operational condition of said continuously variable transmission, said at least one vehicle brake system operational condition indicated by said at least one signal including brake actuating pressure generated only for said rear wheel brakes by said master cylinder during master cylinder actuation;

and control means receiving said at least one information signal and said another information signal and generating one or more control signals, one such control signal controlling said continuously variable transmission in accordance with said information signals received by said control means to control regenerative braking of said front wheel brakes and storage of front wheel braking energy in said energy storage means.

5. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including at least one information signal indicating at least one operational condition in said vehicle brake system and another information signal from said continuously variable transmission indicating an operational condition of said continuously variable transmission, said at least one vehicle brake system operational condition indicated by said at least one signal including a brake actuating pressure generated by a portion of said brake actuating pressures generating means other than said master cylinder;

and control means receiving said at least one information signal and said another information signal and generating one or more control signals, one such control signal controlling said continuously variable transmission in accordance with said information signals received by said control means to control regenerative braking of said front wheel brakes and storage of front wheel braking energy in said energy storage means.

6. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including at least one information signal indicating at least one operational condition in said vehicle brake system and another information signal from said continuously variable transmission indicating an operational condition of said continuously variable transmission, said at least one vehicle brake system operational condition indicated by said at least one signal including the amount of travel of said brake pedal from the pedal released position during master cylinder actuation by movement of said brake pedal;

and control means receiving said at least one information signal and said another information signal and generating one or more control signals, one such control signal controlling said continuously variable transmission in accordance with said information signals received by said control means to control regenerative braking of said front wheel brakes and storage of front wheel braking energy in said energy storage means.

7. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including at least one information signal indicating at least one operational condition in said vehicle brake system and another information signal from said continuously variable transmission indicating an operational condition of said continuously variable transmission, another of said at least one vehicle brake system operational conditions indicated by another of said at least one signals including front wheel characteristics indicative of at least incipient excessive front wheel slip approaching wheel lock during braking of the front wheels of the vehicle by said front wheel brakes;

and control means receiving said at least one information signal and said another information signal and generating one or more control signals, one such control signal controlling said continuously variable transmission in accordance with said information signals received by said control means to control regenerative braking of said front wheel brakes and storage of front wheel braking energy in said energy storage means.

8. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating informations signals including different information signal indicating different operational conditions in said vehicle brake system and another information signal from said continuously variable transmission indicating an operational condition of said continuously variable transmission, said vehicle brake system operational conditions indicated by said information signals including brake actuating pressure being generated by said master cylinder during master cylinder actuation and another brake actuating pressure generated by a portion of said brake actuating pressures generating means other than said master cylinder;

and control means receiving said different information signals and said another information signal and generating one or more control signals, one such control signal controlling said continuously variable transmission in accordance with said information signals received by said control means to control regenerative braking of said front wheel brakes and storage of front wheel braking energy in said energy storage means.

9. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including different information signals indicating different operational conditions in said vehicle brake system and another information signal from said continuously variable transmission indicating an operational condition of said continuously variable transmission, said vehicle brake system operational conditions indicated by said information signals including the amount of travel of said brake pedal from the pedal released position during master cylinder actuation by movement of said brake pedal and front wheel characteristics indicative of at least incipient excessive front wheel slip approaching wheel lock during braking of the front wheels of the vehicle by said front wheel brakes;

and control means receiving said different information signals and said another information signal and generating one or more control signals, one such control signal controlling said continuously variable transmission in accordance with said information signals received by said control means to control regenerative braking of said front wheel brakes and storage of front wheel braking energy in said energy storage means.

10. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including different information signals indicating different operational conditions in said vehicle brake system and another information signal from said continuously variable transmission indicating an operational condition of said continuously variable transmission, said vehicle brake system operational conditions indicated by said information signals including: brake actuating pressure being generated by said master cylinder during master cylinder actuation, the amount of travel of said brake pedal from the pedal released position during master cylinder actuation by movement of said brake pedal, and front wheel characteristics indicative of at least incipient excessive front wheel slip approaching wheel lock during braking of the front wheels of the vehicle by said front wheel brakes;

and control means receiving said different information signals and said another information signal and generating one or more control signals, one such control signal controlling said continuously variable transmission in accordance with said information signals received by said control means to control regenerative braking of said front wheel brakes and storage of front wheel braking energy in said energy storage means.

11. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including different information signals indicating different operational conditions in said vehicle brake system and another information signal from said continuously variable transmission indicating an operational condition of said continuously variable transmission, said vehicle brake system operational conditions indicated by said information signals including brake actuating pressure being generated by said master cylinder during master cylinder actuation and the amount of travel of said brake pedal from the pedal released position during master cylinder actuation by movement of said brake pedal;

and control means receiving said different information signals and said another information signal and generating one or more control signals, one such control signal controlling said continuously variable transmission in accordance with said information signals received by said control means to control regenerative braking of said front wheel brakes and storage of front wheel braking energy in said energy storage means.

12. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including at least one information signal indicating at least one operational condition in said vehicle brake system and another information signal from said continuously variable transmission indicating an operational condition of said continuously variable transmission;

control means receiving said at least one information signal and said another information signal and generating control signals, one such control signal controlling said continuously variable transmission in accordance with said information signals received by said control means to control regenerative braking of said front wheel brakes and storage of front wheel braking energy in said energy storage means;

and controlled pressure modulating valve means in the hydraulic brake circuit for said front wheel brakes, said valve means receiving at least one other control signal from said control means and modulating the actuating pressures received by said front wheel brakes from at least a portion of said brake actuating pressure generating means during vehicle brake system actuation.

13. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including different information signals indicating different operational conditions in said vehicle brake system and another information signal from said continuously variable transmission indicating an operational condition of said continuously variable transmission;

control means receiving said different information signals and said another information signal and generating control signals, one such control signal controlling said continuously variable transmission in accordance with said information signals received by said control means to control regenerative braking of said front wheel brakes and storage of front wheel braking energy in said energy storage means;

controlled pressure modulating valve means in the hydraulic brake circuit for said front wheel brakes, said valve means receiving at least one other control signal from said control means and modulating the actuating pressures received by said front wheel brakes from at least a portion of said brake actuating pressure generating means during vehicle brake system actuation;

and said brake actuating pressures generating means also including a hydraulic fluid pump having a pump reservoir and a pressure outlet and a hydraulic fluid pressure accumulator in fluid communication with said pressure outlet, said accumulator also being in fluid communication with said front hydraulic brake circuit, said pump and said accumulator providing brake actuating pressures to said front wheel brakes under control of said pressure modulating valve means, said control means monitoring pressure from said pump and said accumulator and controlling the operation of said pump to maintain the monitored pressure within preset pressure limits sufficient to assure adequate brake actuating pressure for said front wheel brakes.

14. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder; a combined service brake and regenerating braking system comprising:

said front wheel brakes when activated selectively driving an energy storage and releasing means through a continuously variable transmission;

means generating information signals including at least one information signal indicating at least one operational condition in said vehicle brake system and another information signal from said continuously variable transmission indicating an operational condition of said continuously variable transmission, said at least one vehicle brake system operational condition indicated by said at least one signal including brake actuating pressure being generated by said master cylinder during master cylinder actuation;

control means receiving said at least one information signal and said another information signal and generating one or more control signals, one such control signal controlling said continuously variable transmission in accordance with said information signals received by said control means to control regenerative braking of said front wheel brakes and storage of front wheel braking energy in said energy storage means;

and controlled pressure modulating valve means in the hydraulic brake circuit for said front wheel brakes, said valve means receiving at least one other control signal from said control means and modulating the actuating pressures received by said front wheel brakes from at least a portion of said brake actuating pressure generating means during vehicle brake system actuation.

15. In a vehicle brake system having front and rear hydraulic brake circuits and front wheel brakes and rear wheel brakes actuatable by hydraulic brake actuating pressures respectively in said front and rear hydraulic brake circuits, means including a master cylinder for generating hydraulic brake actuating pressures, and a brake actuator movable to actuate said master cylinder, said master cylinder generating hydraulic brake actuating pressure only for said rear hydraulic brake cirucit; a combined service brake and regenerating braking system comprising:

said front wheel brakes when activated selectively driving an energy storage and releasing means through a continuously variable transmission;

means generating information signals including different information signals indicating different operational conditions in said vehicle brake system and another information signal from said continuously variable transmission indicating an operational condition of said continuously variable transmission, said vehicle brake system operational conditions indicated by said information signals including brake actuating pressure generated by a portion of said brake actuating pressures generating means other than said master cylinder, the amount of travel of said brake pedal from the pedal released position during master cylinder actuation by movement of said brake pedal, and front wheel characteristics indicative of at least incipient excessive front wheel slip approaching wheel lock during braking of the front wheels of the vehicle by said front wheel brakes;

control means receiving said different information signals and said another information signal and generating one or more control signals, one such control signal controlling said continuously variable transmission in accordance with said information signals received by said control means to control regenerative braking of said front wheel brakes and storage of front wheel braking energy in said energy storage means;

controlled pressure modulating valve means in the hydraulic brake circuit for said front wheel brakes, said valve means receiving at least one other control signal from said control means and modulating the actuating pressures received by said front wheel brakes from at least a portion of said brake actuating pressure generating means during vehicle brake system actuation;

and said brake actuating pressures generating means also including a hydraulic fluid pump having a pump reservoir and a pressure outlet and a hydraulic fluid pressure accumulator in fluid communication with said pressure outlet, said accumulator also being in fluid communication with said front hydraulic brake circuit, said pump and said accumulator providing brake actuating pressures to said front wheel brakes under control of said pressure modulating valve means, said control means monitoring pressure from said pump and said accumulator and controlling the operation of said pump to maintain the monitored pressure within preset pressure limits sufficient to assure adequate brake actuating pressure for said front wheel brakes.

* * * * *